United States Patent
Srivastava et al.

(10) Patent No.: US 11,171,775 B2
(45) Date of Patent: Nov. 9, 2021

(54) METHOD AND SYSTEM FOR DEVICE LEVEL AUTHENTICATION IN ELECTRONIC TRANSACTIONS

(71) Applicant: Mastercard International Incorporated, Purchase, NY (US)

(72) Inventors: Abhinava Srivastava, Singapore (SG); Sapankumar K. Mandloi, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 608 days.

(21) Appl. No.: 15/841,718

(22) Filed: Dec. 14, 2017

(65) Prior Publication Data

US 2019/0190704 A1   Jun. 20, 2019

(51) Int. Cl.
*H04L 9/08* (2006.01)
*G06Q 20/38* (2012.01)
*G06Q 20/40* (2012.01)
*H04L 29/06* (2006.01)

(52) U.S. Cl.
CPC ....... *H04L 9/0825* (2013.01); *G06Q 20/3829* (2013.01); *G06Q 20/40* (2013.01); *H04L 9/0861* (2013.01); *H04L 63/0428* (2013.01); *H04L 63/067* (2013.01); *H04L 63/08* (2013.01)

(58) Field of Classification Search
CPC . H04L 9/0825; H04L 9/0861; H04L 63/0428; H04L 63/067; H04L 63/08; G06Q 20/3829; G06Q 20/40
See application file for complete search history.

(56) References Cited

U.S. PATENT DOCUMENTS

| | | | | |
|---|---|---|---|---|
| 2005/0152543 A1* | 7/2005 | Shima | ................... | G06F 21/608 380/51 |
| 2011/0302405 A1* | 12/2011 | Marlow | .............. | H04L 63/0428 713/150 |
| 2013/0262317 A1* | 10/2013 | Collinge | ........... | H04W 12/0023 705/71 |
| 2015/0304110 A1* | 10/2015 | Oberheide | .............. | H04L 63/12 713/155 |
| 2016/0242030 A1* | 8/2016 | Pang | ...................... | H04L 9/0825 |
| 2017/0295018 A1* | 10/2017 | Whitehouse | ............ | H04L 63/10 |
| 2018/0025332 A1* | 1/2018 | Huang | ............... | G06Q 20/3674 705/71 |
| 2018/0047023 A1* | 2/2018 | Bouda | .............. | G06Q 20/38215 |
| 2019/0190704 A1* | 6/2019 | Srivastava | ............ | H04L 63/067 |

* cited by examiner

*Primary Examiner* — Saleh Najjar
*Assistant Examiner* — Devin E Almeida
(74) *Attorney, Agent, or Firm* — Buchanan Ingersoll & Rooney PC

(57) ABSTRACT

A method for distributing data to a computing device using device level authentication includes: storing, in a memory of a computing device, a single use key encrypted with a first encryption, a server public key, and device data; generating a key pair comprising a device private key and a corresponding device public key; wrapping the device public key using the server public key; transmitting at least the device data, wrapped device public key, and the single use key encrypted with the first encryption to a server; receiving the single use key encrypted with a second encryption from the server; and executing a query on the memory to insert the received single use key encrypted with the second encryption.

12 Claims, 8 Drawing Sheets

METHOD AND SYSTEM FOR DEVICE LEVEL AUTHENTICATION IN ELECTRONIC TRANSACTIONS

FIELD

The present disclosure relates to the distributing of data to computing devices using device level authentication, specifically the use of a third party system for additional device level authentication to ensure reliability and validity in the distributing of data to a computing device for use in electronic transactions.

BACKGROUND

The increasing prevalence of computing devices has led to an increase usage in computing devices for electronic transactions that involve the usage and transmission of sensitive data, such as in payment transactions where sensitive payment credentials must be electronically transmitted. Traditionally, computing devices utilized specialized storage to store such sensitive data, such as Secure Elements or other trusted storage environments. However, many computing devices have been developed that do not have such types of storage. As a result, methods have been developed to accommodate the distributing of sensitive data to and storage on computing devices without the use of specialized storage.

A method that has been developed utilizes encryption, where the data being distributed to the device is encrypted and can be decrypted using data provided by a user of the computing device. Unfortunately, such a method may be inconvenient for some users, who may prefer to utilize the distributed data without having to continuously re-enter information. Storage of the information locally in the device may present a risk that the information is compromised.

Thus, there is a need for a technical solution whereby data may be distributed to a computing device for storage and use thereby, where the data is unsuitable for use without the performing of additional authentication that may be performed without utilizing user-provided data.

SUMMARY

The present disclosure provides a description of systems and methods for distributing data to a computing device using device level authentication. The use of device level authentication can provide for an additional level of authentication to ensure that the distributed data is protected. In addition, the distributed data is initially encrypted in a manner that is unable to be decrypted by the computing device, which must rely on an external system to utilize the encrypted data and provide the data in a different encrypted form suitable for decryption by the device, which ensures that the data cannot be utilize if the device is compromised, and requires authentication of the device (e.g., to ensure that it has not been compromised) prior to usage.

A method for distributing data to a computing device using device level authentication includes: storing, in a memory of a computing device, at least a single use key encrypted with a first encryption, a server public key, and device data; generating, by a generation module of the computing device, a key pair comprising a device private key and a corresponding device public key; wrapping, by an encryption module of the computing device, the device public key using the server public key; electronically transmitting, by a transmitting device of the computing device, at least the device data, wrapped device public key, and the single use key encrypted with the first encryption to a server; receiving, by a receiving device of the computing device, the single use key encrypted with a second encryption from the server; and executing, by a querying module of the computing device, a query on the memory to insert the received single use key encrypted with the second encryption.

Another method for distributing data to a computing device using device level authentication includes: storing, in a memory of a processing server, at least a server private key of a key pair and a personal identification number; receiving, by a receiving device of the processing server, at least a device public key wrapped with a server public key corresponding to the server private key of the key pair, device data, and a single use key encrypted with a first encryption from a computing device; electronically transmitting, by a transmitting device of the processing server, at least the device data to a third party for attestation of the computing device; receiving, by the receiving device of the processing server, a notification from the third party indicating successful attestation of the computing device; unwrapping, by an encryption module of the processing server, the device public key using the server private key; decrypting, by the encryption module of the processing server, the single use key using the personal identification number; encrypting, by the encryption module of the processing server, the single use key with a second encryption using the unwrapped device public key; and electronically transmitting, by the transmitting device of the processing server, the single use key encrypted with the second encryption to the computing device.

A system for distributing data to a computing device using device level authentication includes: a memory of a computing device configured to store at least a single use key encrypted with a first encryption, a server public key, and device data; a generation module of the computing device configured to generate a key pair comprising a device private key and a corresponding device public key; an encryption module of the computing device configured to wrap the device public key using the server public key; a transmitting device of the computing device configured to electronically transmit at least the device data, wrapped device public key, and the single use key encrypted with the first encryption to a server; a receiving device of the computing device configured to receive the single use key encrypted with a second encryption from the server; and a querying module of the computing device configured to execute a query on the memory to insert the received single use key encrypted with the second encryption.

Another system for distributing data to a computing device using device level authentication includes: an encryption module of a processing server; a memory of the processing server configured to store at least a server private key of a key pair and a personal identification number; a receiving device of the processing server configured to receive at least a device public key wrapped with a server public key corresponding to the server private key of the key pair, device data, and a single use key encrypted with a first encryption from a computing device; and a transmitting device of the processing server configured to electronically transmit at least the device data to a third party for attestation of the computing device, wherein the receiving device of the processing server is further configured to receive a notification from the third party indicating successful attestation of the computing device, the encryption module of the processing server is configured to unwrap the device public key using the server private key, decrypt the single use key using the personal identification number, and encrypt the single use key with a second encryption using the unwrapped device public key, and the transmitting device of the processing server is further configured to electronically transmit the single use key encrypted with the second encryption to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
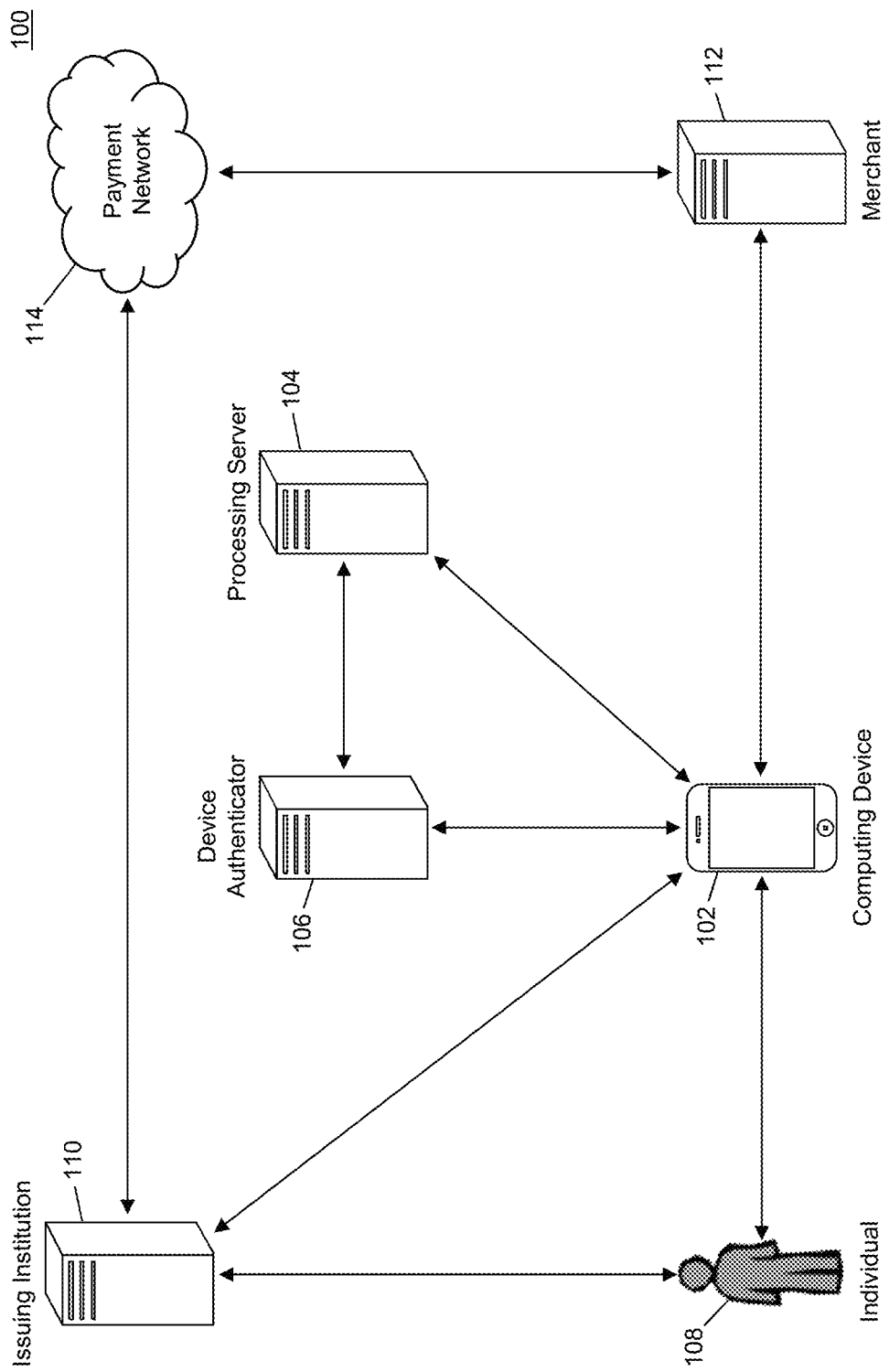
FIG. 1 is a block diagram illustrating a high level system architecture for distributing data to computing devices using device level authentication in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Distributing Data with Device Level Authentication

FIG. 1 illustrates a system 100 for the distributing of data to a computing device 102 where the data is unable for usage on the computing device 102 prior to the performing of device level authentication utilizing a third party processing system.

The computing device 102, discussed in more detail below, may be configured to receive data distributed thereto for use in conducting electronic transactions. The computing device 102 may be any type of computing device suitable for performing the functions discussed herein, such as a desktop computer, laptop computer, notebook computer, tablet computer, cellular phone, smart phone, smart watch, smart television, wearable computing device, implantable computing device, etc., which may be specially configured to perform the functions discussed herein. The computing device 102 may include specialized, secure storage that is configured for the storage of data distributed to the computing device 102, such as a Secure Element, in addition to traditional storage methods.

The system 100 may also include a processing server 104. The processing server 104, discussed in more detail below, may be a specially configured computing system that is configured to assist with the attestation of the computing device 102 for authentication of the device, and the distributing of encrypted data to the computing device 102. In one embodiment, attestation may be performed, in part, by a device authenticator 106. The device authenticator 106 may be the manufacturer of the computing device 102 or another entity configured to authenticate the computing device 102 by performing a suitable method for device level authentication. In other embodiments, attestation may be performed by the processing server 104, which may be configured to perform device level authentication and the distributing of data to the computing device 102.

The computing device 102 may be operated by an individual 108 associated therewith. Data may be distributed to the computing device 102 that may be encrypted using a first type of encryption, for which the computing device 102 may not possess the keys, data, and/or algorithms necessary for the decryption thereof. In an exemplary embodiment, the data may be a single use key that is used in the identification, generation, transmission of, or otherwise provide accessibility to additional data stored in the computing device 102. For instance, in the example illustrated in FIG. 1, the single use key may be used as part of payment credentials for use in funding an electronic payment transaction. In the system 100, an issuing institution 110, such as a financial institution (e.g., issuing bank) or other suitable type of entity, may be configured to issue a transaction account to the individual 108 for use in funding electronic payment transactions. As part of the issuance of the transaction account, the issuing institution 110 may provision payment credentials or data associated therewith to the computing device 102.

The issuing institution 110 may also provision an encrypted single use key to the computing device 102, where the single use key is used by the computing device 102 to generate or otherwise access the payment credentials. The single use key may be encrypted using data associated with the transaction account. In one embodiment, the single use key may be encrypted using a personal identification number (PIN) set by the individual 108. In some cases, the PIN may be the same PIN set by the individual 108 for use in traditional payment transactions funded using the transaction account (e.g., via a debit card at a traditional point of sale). The data used to encrypt the single use key may be distributed to the processing server 104. In one embodiment, the data may be electronically transmitted to the processing server 104 by the issuing institution 110, such as during a registration process. In another embodiment, the data may be provided by the computing device 102 to the processing server 104, such as during registration of the computing device 102 for use in performing the functions discussed herein. In an exemplary embodiment, the data may not be stored in or otherwise accessible by the computing device 102, such as to prohibit the computing device 102 from being able to decrypt the encrypted single use key via the first encryption.

As part of registration of the computing device 102 with the processing server 104, the processing server 104 may electronically transmit a public key to the computing device 102, referred to herein as a server public key. The server public key may be part of a key pair generated by or otherwise associated with the processing server 104 that is comprised of the server public key and a corresponding server private key. The processing server 104 may transmit the public key to the computing device 102 using any suitable communication network and method. The computing device 102 may receive the server public key, which may be stored therein.

In addition to the server public key, the computing device 102 may receive the encrypted single use key, encrypted via the first encryption (e.g., the PIN or other data), from the issuing institution 110. In some cases, a new encrypted single use key may be received following the processing of an electronic payment transaction using an earlier distributed single use key. The individual 108 may request device level authentication of the computing device 102, in configure the computing device 102 for use of the single use key in an electronic payment transaction. For instance, the individual 108 may use an application program or other suitable method for inputting a request for authentication and usage of the single use key. The computing device 102 may generate a key pair. The key pair may be comprised of a private key and a public key, referred to herein as a device private key and a device public key.

The computing device 102 may wrap the device public key with the server public key using a suitable key-wrapping algorithm. The computing device 102 may then electronically transmit the wrapped device public key to the processing server 104 using a suitable communication network and method. The computing device 102 may also provide additional data to the processing server 104 for attestation of the computing device 102. The additional data may include device data associated with the computing device 102, and may be based on the type of authentication being performed. For instance, the device data may include data generated by the computing device 102, previously provided to the computing device 102, etc. Data suitable for use in the attestation of a computing device 102 will be apparent to persons having skill in the relevant art. In some embodiments, the device data may be electronically transmitted to the processing server 104, which may forward the data to the device authenticator 106 as applicable. In other embodiments, the computing device 102 may electronically transmit the wrapped device public key to the processing server 104, but may electronically transmit the device data directly to the device authenticator 106 for attestation.

Attestation of the computing device 102 may then be performed, to authenticate the computing device 102 at the device level, such as to ensure that the computing device 102 has not been compromised. In instances where the device authenticator 106 performs the attestation, the device authenticator 106 may electronically transmit a result of the attestation to the processing server 104, such as indicating successful or unsuccessful authentication of the computing device 102. If attestation is unsuccessful, the processing server 104 may notify the computing device 102 accordingly, which may notify the individual 108 and, in some cases, may repeat the attestation process. Upon successful attestation, the processing server 104 may notify the computing device 102 that attestation was successful, and may request the encrypted single use key. The computing device 102 may receive the notification, and forward the encrypted single use key to the processing server 104. In some embodiments, the encrypted single use key may be provided to the processing server 104 with the wrapped device public key. In such embodiments, the processing server 104 may continue performing the functions discussed herein without notifying the computing device 102 of the attestation and/or requesting the single use key.

The processing server 104 may unencrypt the single use key using the previously provided data, such as the PIN registered to the individual 108 and the transaction account.

The processing server 104 may unwrap the device public key using the server private key. The processing server 104 may then encrypt the unencrypted single use key using the device public key, which may result in the single use key being encrypted using a second encryption (e.g., the device public key as opposed to the registered account data, i.e., the PIN). The processing server 104 may electronically transmit the encrypted single use key to the computing device 102. The computing device 102 may then retain and store the encrypted single use key, encrypted with the second encryption.

Once the individual 108 seeks to conduct an electronic payment transaction, the individual 108 may request that the encrypted single use key be decrypted and used to generate, access, or otherwise obtain the payment credentials. The computing device 102 may be configured to decrypt the encrypted single use key using the previously generated server private key. The computing device 102 may then use the single use key to generate or otherwise identify the payment credentials. Additional information regarding the distributing of single use keys and use thereof in generating or otherwise identifying payment credentials can be found in U.S. patent application Ser. No. 13/827,042, entitled "Systems and Methods for Processing Mobile Payments by Distributing Credentials to Mobile Devices Without Secure Elements," by Mehdi Collinge et al., filed Mar. 14, 2013, which is herein incorporated by reference in its entirety.

The computing device 102 may electronically transmit the payment credentials (e.g., and the single use key, as applicable), to a merchant 112 using a suitable communication network and method. For instance, the computing device 102 may electronically transmit the payment credentials to a point of sale device associated with the merchant 112 using near field communication, may display a machine-readable code encoded with the payment credentials for reading by an optical imager of a point of sale device of the merchant 112, etc. The merchant 112 may then submit the payment credentials and additional transaction data for the electronic payment transaction to the payment network 114 (e.g., via one or more intermediate entities, as applicable, such as an acquiring financial institution). The payment network 114 may receive the payment credentials and additional transaction data and may process the payment transaction using traditional methods and systems, which may include the forwarding of the transaction data, including the payment credentials, to the issuing institution 110 for approval thereof. As part of the processing of the payment transaction, the payment network 114 may receive a transaction message, which may be forwarded to the issuing institution 110 during processing. Transaction messages may be specially formatted data messages that are formatted pursuant to one or more standards governing the exchange of financial transaction messages, such as the International Organization of Standardization's ISO 8583 or 20022 standards.

The methods and systems discussed herein may enable a computing device 102 to be distributed data thereto that is not accessible until device level authentication is performed. The use of device level authentication may ensure that sensitive data is distributed to the computing device 102 and accessible thereby without the need for the individual 108 to supply data each time the distributed data needs to be accessed. In addition, the use of the device level authentication by the processing server 104 ensures that the computing device 102 may initially receive the data, but cannot access it without first being authenticated, to ensure that the device is not compromised, and such that the data is unusable in the event that the device is compromised. As a result, the methods and systems discussed herein provide for greater convenience and security for the usage of the computing device 102 for the receipt, storage, and use of sensitive data.

Computing Device

Figure 2:
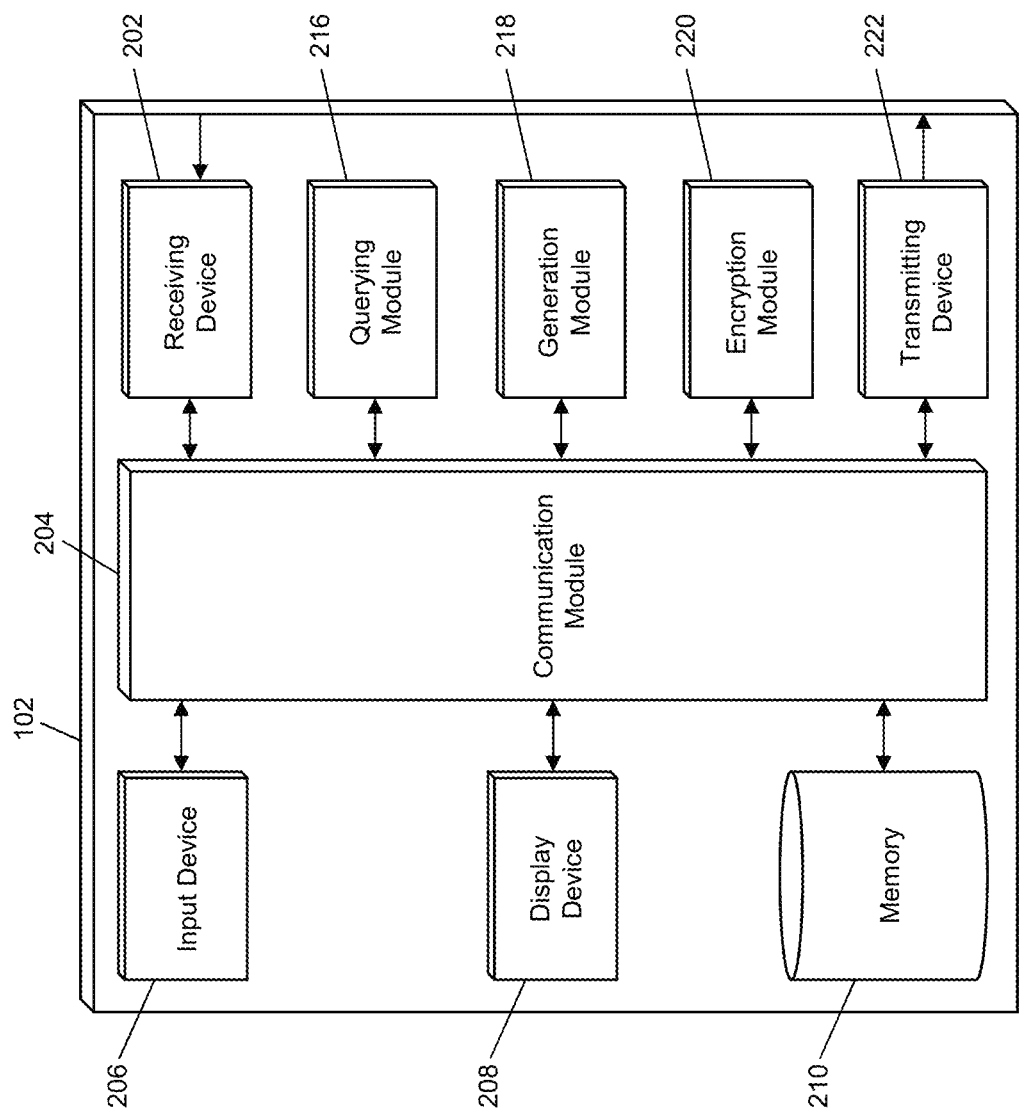
FIG. 2 is a block diagram illustrating the computing device of the system of FIG. 1 for the distributing of data thereto using device level authentication in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 700 illustrated in FIG. 7 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from processing servers 104, device authenticators 106, issuing institutions 110, merchants 112, and other systems and entities via one or more communication methods, such as near field communication, cellular communication networks, local area networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 110, which may be superimposed or otherwise encoded with encrypted single use keys, encrypted via a first encryption for which the computing device 102 may not be configured for decryption, and payment credentials. The receiving device 202 may also be configured to receive data signals electronically transmitted by device authenticators 106, which may be superimposed or otherwise encoded with data used in attestation of the computing device 102, such as algorithms, device data, generation rules, attestation results, etc. The receiving device 202 may be configured to receive data signals electronically transmitted by processing servers 104, which may be superimposed or otherwise encoded with attestation results, requests for encrypted single use keys, encrypted single use keys that are encrypted via a second encryption, and server public keys.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 216, generation module 218, encryption module 220. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 206. The input devices 206 may be internal to the computing device 102 or external to the computing device 102 and connected thereto via one or more connections (e.g., wired or wireless) for the transmission of data to and/or from. The input devices 206 may be configured to receive input from a user of the computing device 102, such as the individual 108, which may be provided to another module or engine of the computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive instructions from the individual 108 to request the performing of device level authentication and decryption of single use keys for use in conveying payment credentials to a merchant 112 for use in an electronic payment transactions.

The computing device 102 may also include or be otherwise interfaced with a display device 208. The display device 208 may be internal to the computing device 102 or external to the computing device 102 and connected thereto via one or more connections (e.g., wired or wireless) for the transmission of data to and/or from. The display device 208 may be configured to display data to a user of the computing device 102, such as the individual 108. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 208. The display device 208 may be configured to, for example, display user interfaces to the individual 108 for performing the functions discussed herein, such as for selection of transaction accounts, issuing of instructions, display of attestation results, etc.

The computing device 102 may also include a memory 210. The memory 210 may be configured to store data for use by the computing device 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store a server public key distributed thereto by the processing server 104. The memory 210 may also be configured to store payment credentials and any encrypted single use keys distributed thereto by the issuing institution 110. The memory 210 may also be configured to store key pairs generated by the computing device 102 for use in wrapping the device public key and decrypting encrypted single use keys received (e.g., via the receiving device 202) from the processing server 104. The memory 210 may also be configured to store device data and other data used in device level authentication of the computing device 102.

The computing device 102 may include a querying module 216. The querying module 216 may be configured to execute queries on databases to identify information. The querying module 216 may receive one or more data values or query strings, and may execute a query string based thereon on an indicated database, such as the memory, to identify information stored therein. The querying module 216 may then output the identified information to an appropriate engine or module of the computing device 102 as necessary. The querying module 216 may, for example, execute a query on the memory 210 to identify server public keys for wrapping, device public keys for transmission, device private keys for decryption, etc.

The computing device 102 may also include a generation module 218. The generation module 218 may be configured to generate data for use in performing the functions of the computing device 102 as discussed herein. The generation module 218 may receive an instruction as input, may generate data as instruction, and may output the generated data to another module or engine of the computing device 102. For example, the generation module 218 may be configured to generate key pairs using a suitable key generation algorithm (e.g., stored in and read from the memory 210), which may be comprised of a server private key and a corresponding server public key.

The computing device 102 may also include an encryption module 220. The encryption module 220 may be configured to utilize algorithms for encryption, decryption, and wrapping for the computing device 102. The encryption module 220 may receive data to be encrypted, decrypted, or wrapped, may perform the function as requested, and may output the resulting data to another module or engine of the computing device 102. For example, the encryption module 220 may be configured to wrap device public keys with server public keys for transmission to processing servers 104 and decrypt encrypted single use keys using device private keys.

The computing device 102 may also include a transmitting device 222. The transmitting device 222 may be configured to transmit data over one or more networks via one or more network protocols. In some instances, the transmitting device 222 may be configured to transmit data to processing servers 104, device authenticators 106, issuing institutions 110, merchants 112, and other entities via one or more communication methods, such as near field communication, cellular communication networks, local area networks, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to processing servers 104, which may be superimposed or otherwise encoded with encrypted single use keys, device data for attestation, wrapped device public keys, etc. The transmitting device 222 may also be configured to electronically transmit data signals to device authenticators 106, which may be superimposed or otherwise encoded with device data for attestation of the computing device 102. The transmitting device 222 may be configured to electronically transmit data signals to issuing institutions 110, such as may be superimposed or otherwise encoded with requests for new single use keys. The transmitting device 222 may also be configured to electronically transmit data signals to merchants 112, which may be superimposed or otherwise encoded with payment credentials for use in electronic payment transactions.

Processing Server

Figure 3:
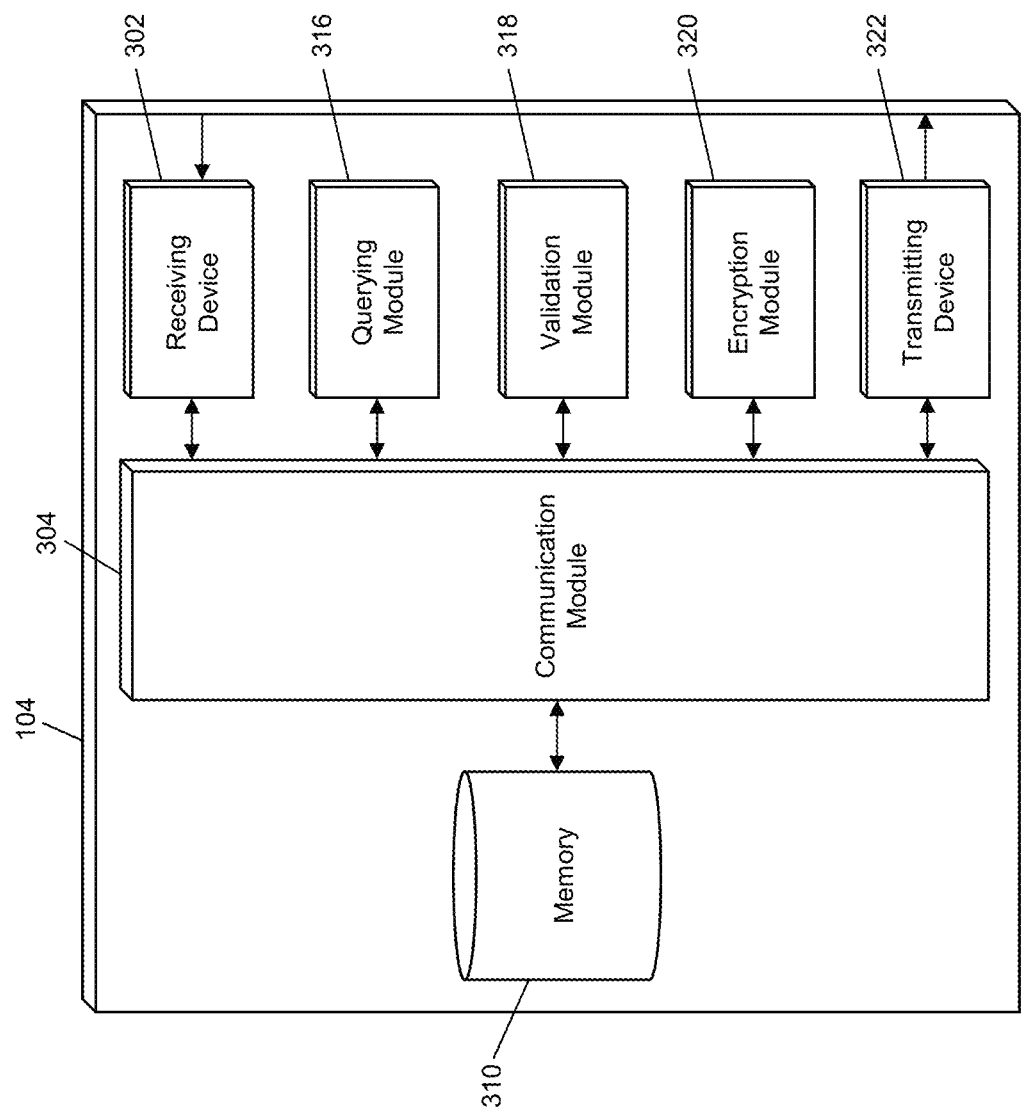
FIG. 3 is a block diagram illustrating the processing server of the system of FIG. 1 for the distributing of data to the computing device of FIG. 2 utilizing device level authentication in accordance with exemplary embodiments.

FIG. 3 illustrates an embodiment of the processing server 104 in the system 100. It will be apparent to persons having skill in the relevant art that the embodiment of the processing server 104 illustrated in FIG. 3 is provided as illustration only and may not be exhaustive to all possible configurations of the processing server 104 suitable for performing the functions as discussed herein. For example, the computer system 700 illustrated in FIG. 7 and discussed in more detail below may be a suitable configuration of the processing server 104.

The processing server 104 may include a receiving device 302. The receiving device 302 may be configured to receive data over one or more networks via one or more network protocols. In some instances, the receiving device 302 may be configured to receive data from computing devices 102, device authenticators 106, issuing institutions 110, and other systems and entities via one or more communication methods, such as near field communication, cellular communication networks, local area networks, Bluetooth, the Internet, etc. In some embodiments, the receiving device 302 may be comprised of multiple devices, such as different receiving devices for receiving data over different networks, such as a first receiving device for receiving data over a local area network and a second receiving device for receiving data via the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by issuing institutions 110, which may be superimposed or otherwise encoded with data used for decryption of single use keys, such as PINs. The receiving device 302 may also be configured to receive data signals electronically transmitted by device authenticators 106, such as may be superimposed or otherwise encoded with attestation results, indicating successful or unsuccessful authentication of a computing device 102. The receiving device 302 may also be configured to receive data signals electronically transmitted by computing devices 102, which may be superimposed or otherwise encoded with device data for attestation, wrapped device public keys, encrypted single use keys, and other data suitable for performing the functions discussed herein.

The processing server 104 may also include a communication module 304. The communication module 304 may be configured to transmit data between modules, engines, databases, memories, and other components of the processing server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the processing server 104 and external components of the processing server 104, such as externally connected databases, display devices, input devices, etc. The processing server 104 may also include a processing device. The processing device may be configured to perform the functions of the processing server 104 discussed herein as will be apparent to persons having skill in the relevant art. In some embodiments, the processing device may include and/or be comprised of a plurality of engines and/or modules specially configured to perform one or more functions of the processing device, such as a querying module 316, validation module 318, encryption module 320. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 104 may also include a memory 310. The memory 310 may be configured to store data for use by the processing server 104 in performing the functions discussed herein, such as public and private keys, symmetric keys, etc. The memory 310 may be configured to store data using suitable data formatting methods and schema and may be any suitable type of memory, such as read-only memory, random access memory, etc. The memory 310 may include, for example, encryption keys and algorithms, communication protocols and standards, data formatting standards and protocols, program code for modules and application programs of the processing device, and other data that may be suitable for use by the processing server 104 in the performance of the functions disclosed herein as will be apparent to persons having skill in the relevant art. In some embodiments, the memory 310 may be comprised of or may otherwise include a relational database that utilizes structured query language for the storage, identification, modifying, updating, accessing, etc. of structured data sets stored therein.

The memory 310 may be configured to store a device public key distributed thereto by the computing device 102. The memory 310 may also be configured to store key pairs generated by the processing server 104 for use in unwrapping keys received from the computing device 102, such as to unwrap device public keys that are wrapped with a server public key, using the corresponding server private key. The memory 310 may also be configured to store data received from issuing institutions 110 and/or computing devices 102 for decrypting of encrypted single use keys, such as PINs.

The processing server 104 may include a querying module 316. The querying module 316 may be configured to execute queries on databases to identify information. The querying module 316 may receive one or more data values or query strings, and may execute a query string based thereon on an indicated database, such as the memory, to identify information stored therein. The querying module 316 may then output the identified information to an appropriate engine or module of the processing server 104 as necessary. The querying module 316 may, for example, execute a query on the memory 310 to identify a server private key for use in unwrapping a device public key, or to identify a device public key for use in encrypting a single use key.

The processing server 104 may also include a validation module 318. The validation module 318 may be configured to validate data for the processing server 102. The validation module 318 may receive data to be validated, may validate the data, and may output a result of the validation to another module or engine of the processing server 104. For example, the validation module 318 may be configured to validate the computing device 102 via device level authentication. The validation module 318 may use suitable methods and systems to validate the computing device 102 as not being compromised, such as by validating data received from the computing device 102 (e.g., via the receiving device 302) as being expected.

The processing server 104 may also include an encryption module 320. The encryption module 320 may be configured to utilize algorithms for encryption, decryption, and wrapping for the processing server 104. The encryption module 320 may receive data to be encrypted, decrypted, or wrapped, may perform the function as requested, and may output the resulting data to another module or engine of the processing server 104. For example, the encryption module 320 may be configured to unwrap device public keys via a server private key stored in the memory 310, decrypt encrypted single use keys received from computing devices 102 using data stored in the memory 310 (e.g., an associated PIN), and encrypt the decrypted single use keys using unwrapped device public keys.

The processing server 104 may also include a transmitting device 322. The transmitting device 322 may be configured to transmit data over one or more networks via one or more network protocols. In some instances, the transmitting device 322 may be configured to transmit data to computing devices 102, device authenticators 106, and other entities via one or more communication methods, such as near field communication, cellular communication networks, local area networks, Bluetooth, radio frequency, the Internet, etc. In some embodiments, the transmitting device 322 may be comprised of multiple devices, such as different transmitting devices for transmitting data over different networks, such as a first transmitting device for transmitting data over a local area network and a second transmitting device for transmitting data via the Internet. The transmitting device 322 may electronically transmit data signals that have data superimposed that may be parsed by a receiving computing device. In some instances, the transmitting device 322 may include one or more modules for superimposing, encoding, or otherwise formatting data into data signals suitable for transmission.

The transmitting device 322 may be configured to electronically transmit data signals to computing devices 102, which may be superimposed or otherwise encoded with attestation results, requests for encrypted single use keys, and encrypted single use keys. The transmitting device 322 may also be configured to electronically transmit data signals to device authenticators 106, which may be superimposed or otherwise encoded with device data for use in device level authentication of a computing device 102.

Process for Distributing of Data with Device Level Authentication

Figure 4A:
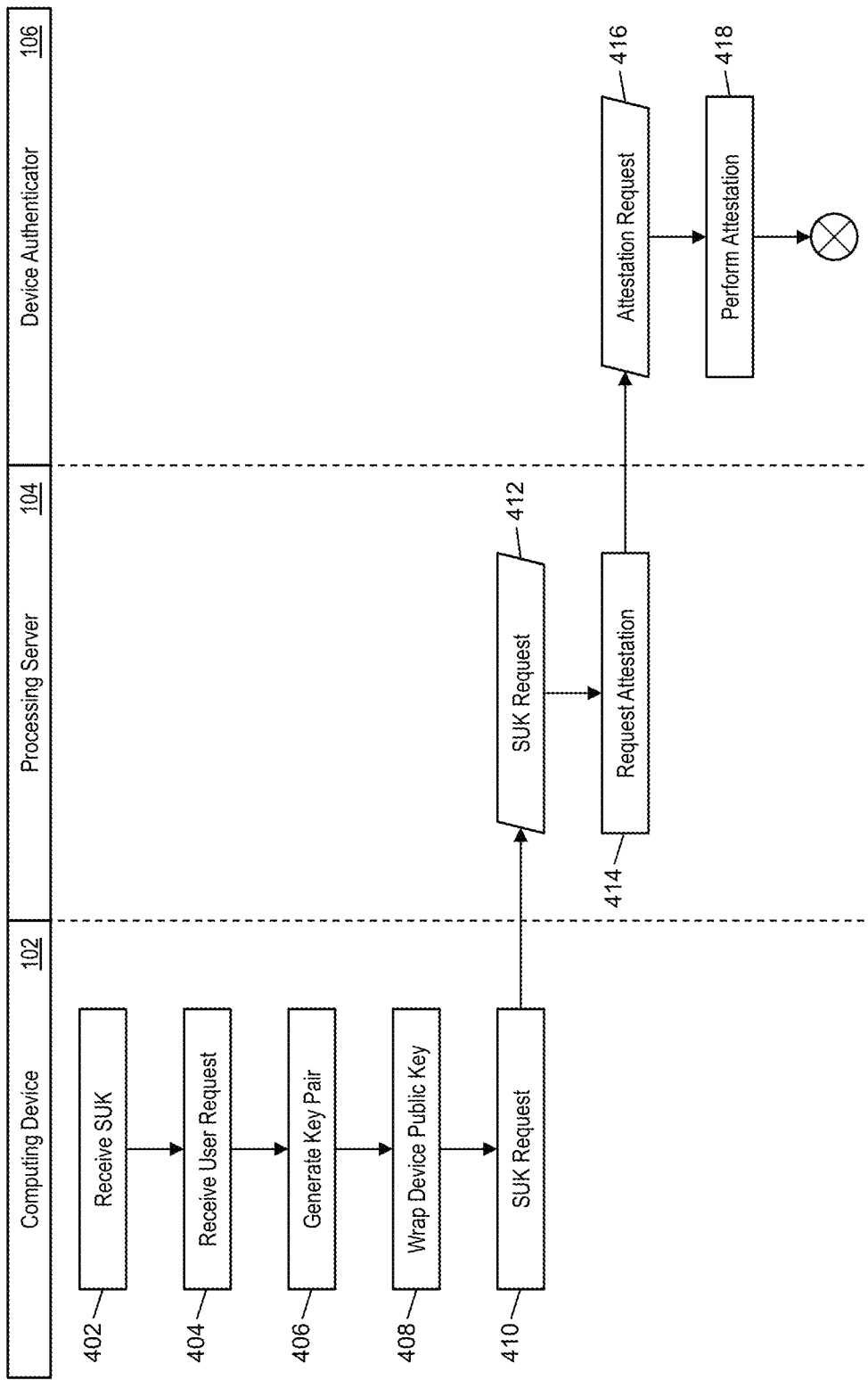
FIGS. 4A and 4B are a flow diagram illustrating a process for distributing data to a computing device with device level authentication using the system of FIG. 1 in accordance with exemplary embodiments.
Figure 4B:
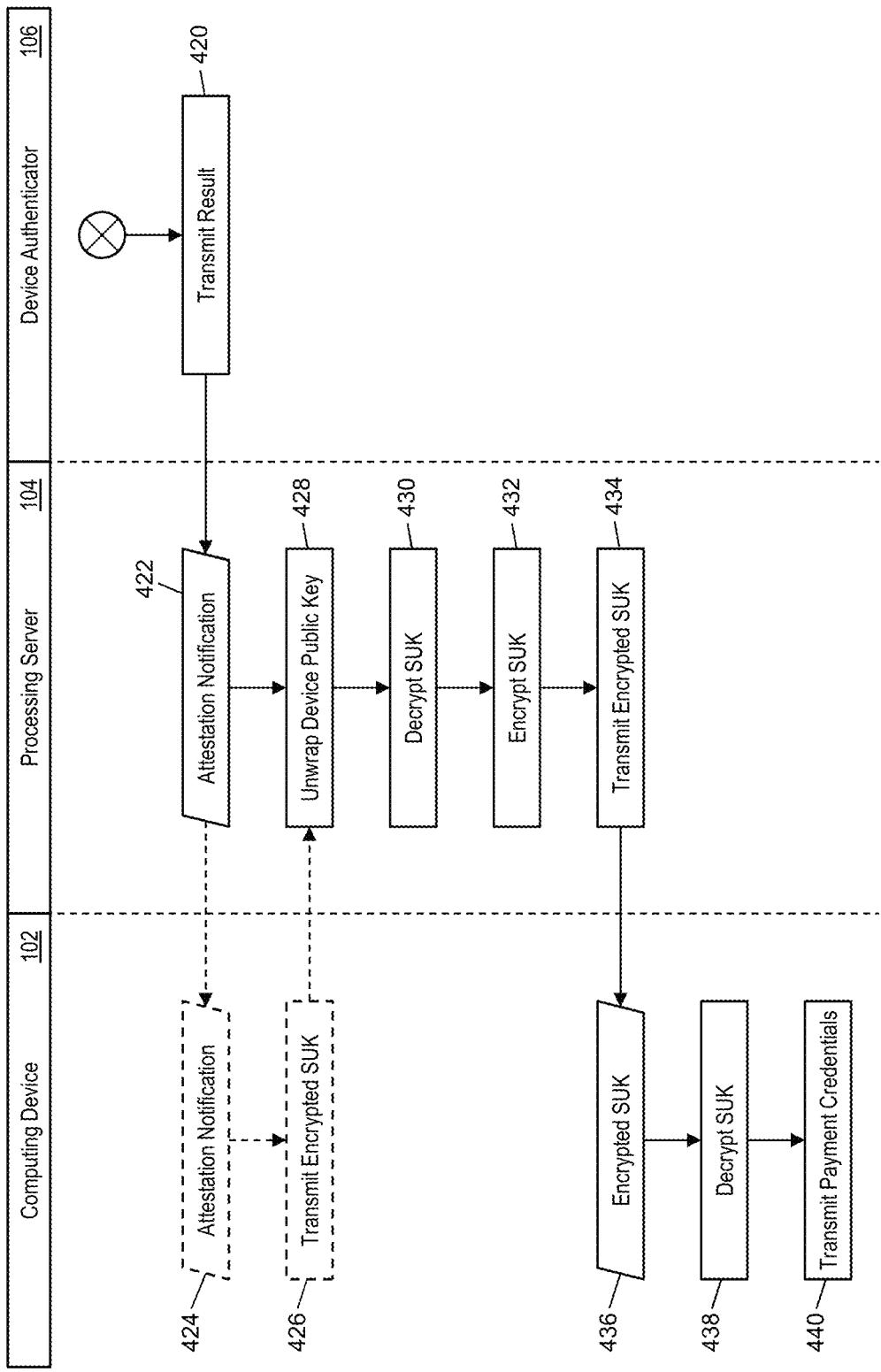

FIGS. 4A and 4B illustrate a process for the distributing of encrypted single use keys to the computing device 102 in the system 100 for decryption thereof following the performing of device level authentication using the processing server 104.

In step 402, the receiving device 202 of the computing device 102 may receive a single use key (SUK) encrypted with a first encryption from the issuing institution 110. In an exemplary embodiment, the computing device 102 may not be configured for decryption of the single use key encrypted with the first encryption. In step 404, the input device 206 interfaced with the computing device 102 may be configured to receive input from the individual 108 requesting device level authentication of the computing device 102 for use of the encrypted single use key. In step 406, the generation module 218 of the computing device 102 may generate a key pair using a suitable key generation algorithm, wherein the key pair is comprised of a device public key and a corresponding device private key.

In step 408, the encryption module 220 of the computing device 102 may wrap the device public key with a server public key previously distributed by the processing server 104 using a suitable key wrapping algorithm. In step 410, the transmitting device 222 of the computing device 102 may electronically transmit a single use key request to the processing server 104, where the single use key request includes at least the wrapped device public key and device data associated with the computing device 102 used in attestation. In some embodiments, the single use key request may also include the encrypted single use key encrypted with the first encryption. In step 412, the receiving device 302 of the processing server 104 may receive the single use key request.

In step 414, the transmitting device 322 of the processing server 104 may electronically transmit an attestation request to the device authenticator 106 to request attestation of the computing device 102. In step 416, the device authenticator 106 may receive the attestation request, where the attestation request includes at least the device data supplied by the computing device 102 in the single use key request. IN step 418, the device authenticator 106 may perform attestation to authenticate the computing device 102 and determine if the computing device 102 has been compromised using a suitable method and system. In step 420, the device authenticator 106 may electronically transmit the result of the attestation indicating successful attestation to the processing server 104.

In step 422, the receiving device 302 of the processing server 104 may receive the attestation result. In embodiments where the computing device 102 did not provide the encrypted single use key in the single use key request, the process may include step 424, where the receiving device 202 of the computing device 102 may receive the indication of successful attestation, and step 426 where the transmitting device 222 of the computing device 102 may transmit the encrypted single use key encrypted with the first encryption to the processing server 104. In step 428, the encryption module 320 of the processing server 104 may unwrap the device public key using the server private key corresponding to the server public key used by the computing device 102 in the wrapping.

In step 430, the encryption module 320 of the processing server 104 may decrypt the single use key using data associated with the computing device 102 as previously supplied by the issuing institution 110 and/or computing device 102, such as a personal identification number. In step 432, the encryption module 320 of the processing server 102 may encrypt the now-decrypted single use key using the device public key that was unwrapped in step 428. In step 434, the transmitting device 322 of the processing server 104 may electronically transmit the encrypted single use key, encrypted with the device public key, to the computing device 102 as a response to the single use key request.

In step 436, the receiving device 202 of the computing device 102 may receive the encrypted single use key, encrypted with the second encryption (e.g., the device public key). In step 438, the encryption module 220 of the computing device 102 may decrypt the encrypted single use key using the device private key that was generated in step 406 that corresponds to the device public key used by the processing server 104. In step 440, the transmitting device 222 of the computing device 102 may electronically transmit payment credentials, generated, identified, or otherwise accessed using the decrypted single use key, to a merchant 112 for use in an electronic payment transaction funded via the related transaction account.

Figure 5:
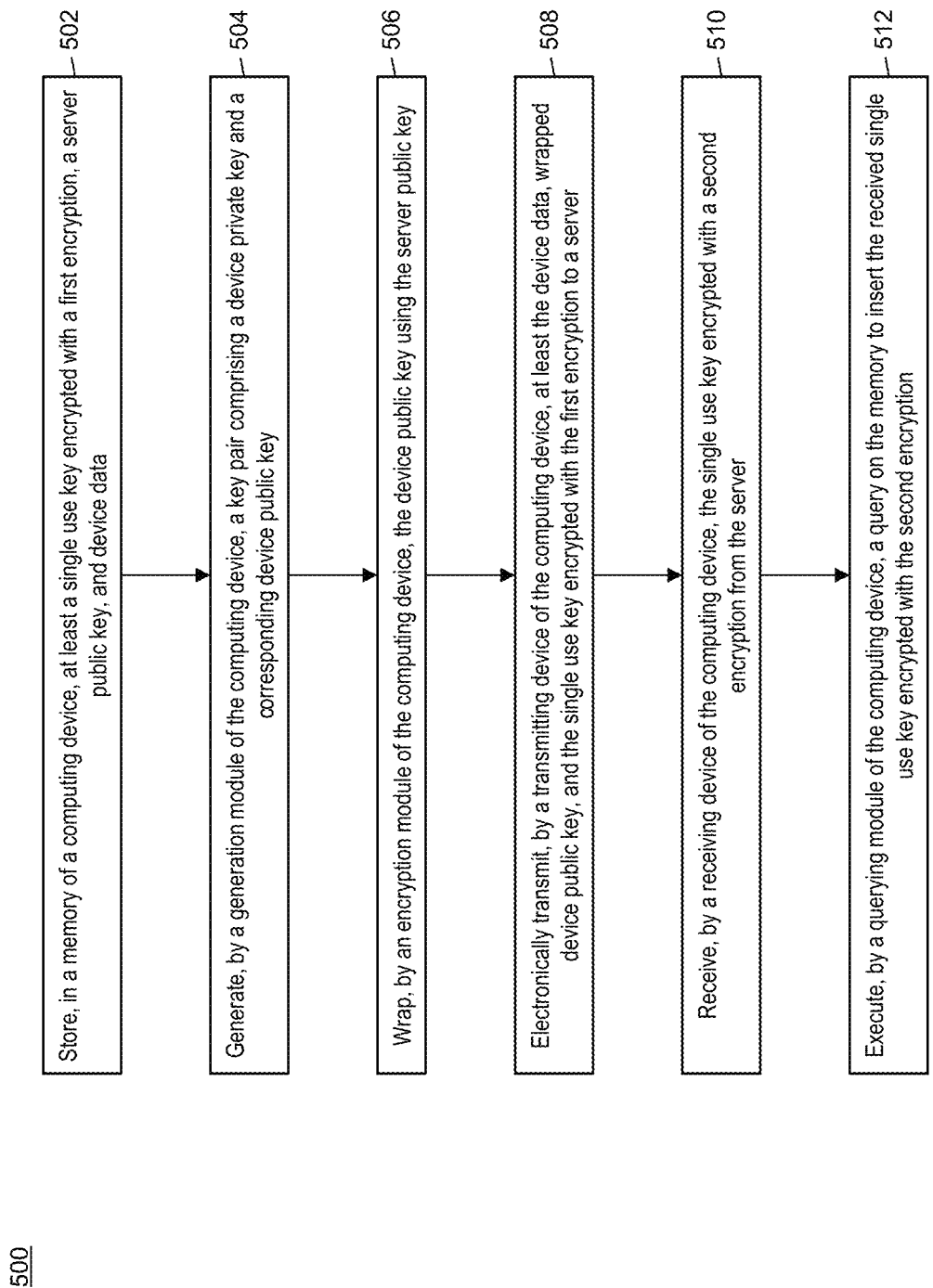
FIGS. 5 and 6 are flow charts illustrating exemplary methods for distributing data to a computing device using device level authentication in accordance with exemplary embodiments.

First Exemplary Method for Distributing Data to a Computing Device Using Device Level Authentication FIG. 5 illustrates a method 500 for the distributing of data to a computing device that is first encrypted and unavailable for access by the computing device but is accessible following device level authentication.

In step 502, at least a single use key encrypted with a first encryption, a server public key, and device data may be stored in a memory (e.g., the memory 210) of a computing device (e.g., the computing device 102). In step 504, a key pair comprising a device private key and a corresponding device public key may be generated by a generation module (e.g., the generation module 218) of the computing device. In step 506, the device public key may be wrapped by an encryption module (e.g., the encryption module 220) of the computing device using the server public key.

In step 508, at least the device data, wrapped device public key, and the single use key encrypted with the first encryption may be electronically transmitted to a server (e.g., the processing server 104) by a transmitting device (e.g., the transmitting device 222) of the computing device. In step 510, the single use key encrypted with a second encryption may be received by a receiving device (e.g., the receiving device 202) of the computing device from the server. In step 512, a query may be executed on the memory by a querying module (e.g., the querying module 216) of the computing device to insert the received single use key encrypted with the second encryption.

In one embodiment, the method 500 may further include receiving, by the receiving device of the computing device, a notification of successful attestation of the computing device, wherein the single use key encrypted with the first encryption is electronically transmitted to the server separately upon receipt of the notification of successful attestation. In some embodiments, the method 500 may also include: receiving, by an input device (e.g., the input device 206) interfaced with the computing device, and instruction requesting usage of the single use key; and decrypting, by the encryption module of the computing device, the single use key encrypted with the second encryption using the device private key. In a further embodiment, the method 500 may even further include electronically transmitting, by the transmitting device of the processing server, the decrypted single use key to a point of sale device, wherein the memory further includes payment credentials, and the payment credentials are electronically transmitted to the point of sale device with the decrypted single use key.

Figure 6:
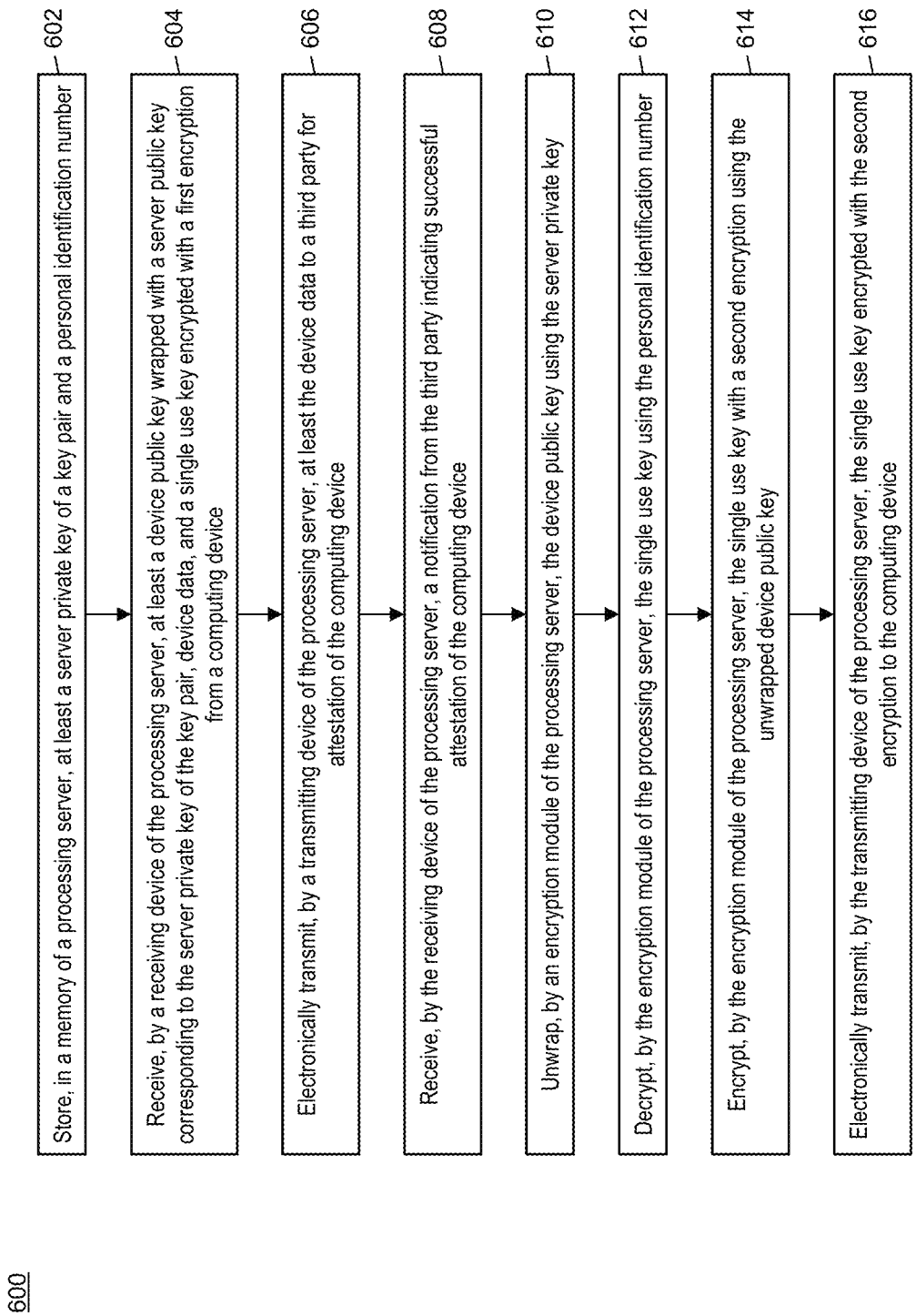

Second Exemplary Method for Distributing Data to a Computing Device Using Device Level Authentication FIG. 6 illustrates a method 600 for the distributing of data to a computing device that is first encrypted and unavailable for access by the computing device until device level authentication is performed by a separate processing server.

In step 602, at least a server private key of a key pair and a personal identification number may be stored in a memory (e.g., the memory 310) of a processing server (e.g., the processing server 104). In step 604, at least a device public key wrapped with a server public key corresponding to the server private key of the key pair and a single use key encrypted with a first encryption may be received by a receiving device (e.g., the receiving device 302) of the processing server from a computing device (e.g., the computing device 102). In step 606, at least the device data may be electronically transmitted by a transmitting device (e.g., the transmitting device 322) to a third party (e.g., the device authenticator 106) for attestation of the computing device. In step 608, a notification may be received by the receiving device of the processing server from the third party indicating successful attestation of the computing device.

In step 610, the device public key may be unwrapped by an encryption module (e.g., the encryption module 320) of the processing server using the server private key. In step 612, the single use key may be decrypted by the encryption module of the processing server using the personal identification number. In step 614, the single use key may be encrypted by the encryption module of the processing server with a second encryption using the unwrapped device public key. In step 616, the single use key encrypted with the second encryption may be electronically transmitted by the transmitting device of the processing server to the computing device.

In one embodiment, the single use key encrypted with the first encryption may be received via a separate electronic transmission from the computing device following receipt of the notification indicating successful attestation of the computing device. In a further embodiment, the method 600 may even further include electronically transmitting, by the transmitting device of the processing server, a notification indicating successful attestation of the computing device to the computing device, wherein the notification is electronically transmitted prior to receipt of the separate electronic transmission from the computing device.

Computer System Architecture

Figure 7:
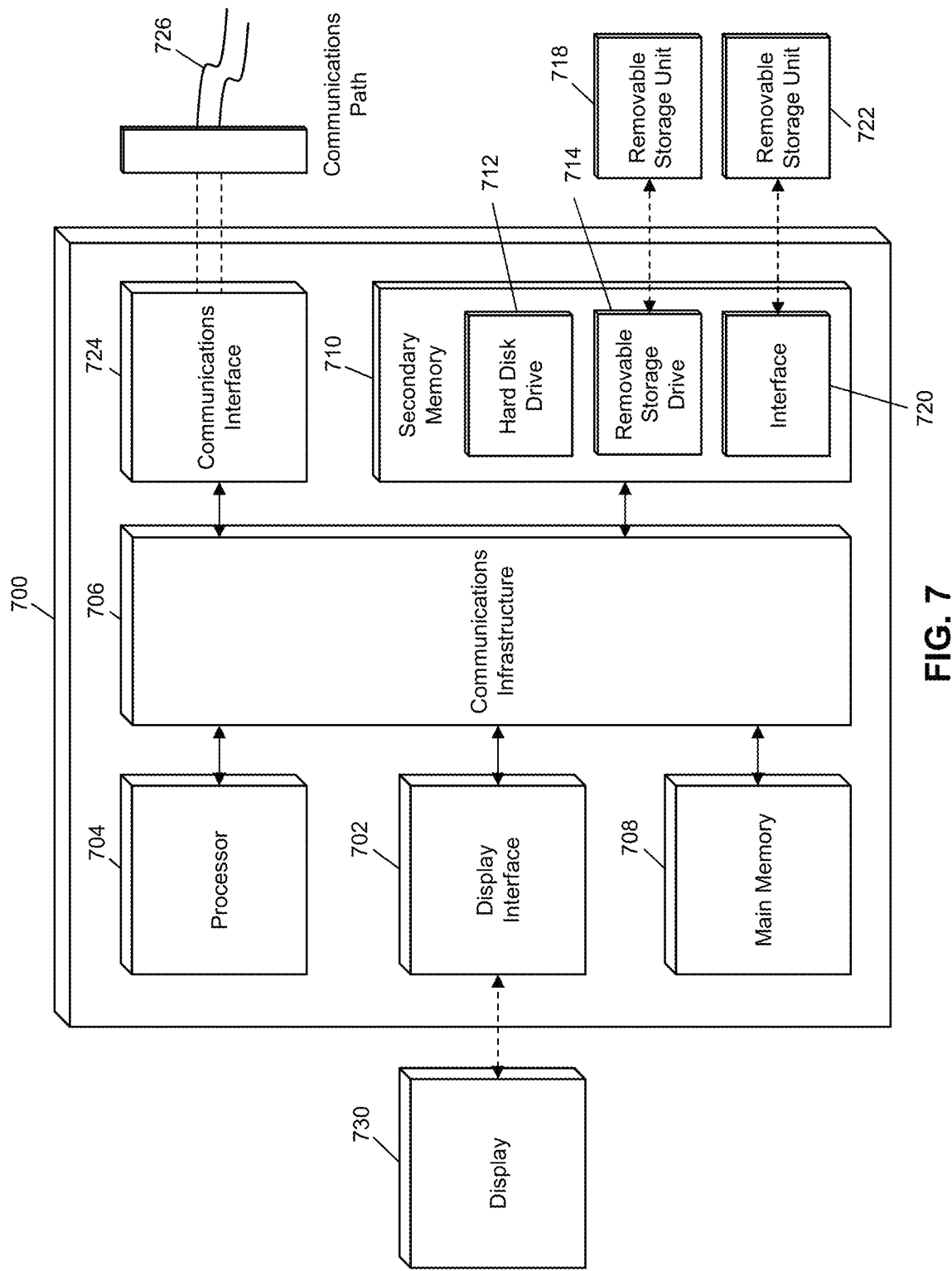
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 102 and processing server 104 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A, 4B, 5, and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4A, 4B, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for distributing data to computing devices using device level authentication. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distributing data to a computing device using device level authentication, comprising:
   receiving, by a receiving device of a computing device, a single use key from an issuing institution, the single use key encrypted by the issuing institution using a first encryption, a server public key, and device data;
   storing, in a memory of the computing device, at least the single use key encrypted using the first encryption, a server public key, and device data;
   generating, by a generation module of the computing device, a key pair comprising a device private key and a corresponding device public key;
   wrapping, by an encryption module of the computing device, the device public key using the server public key;
   electronically transmitting, by a transmitting device of the computing device, at least the device data, wrapped device public key, and the single use key encrypted using the first encryption to a server;
   receiving, by the receiving device of the computing device, the single use key encrypted using a second encryption from the server, the second encryption using the device public key to encrypt the single use key;
   executing, by a querying module of the computing device, a query on the memory to insert the received single use key encrypted using the second encryption;
   decrypting, by the encryption module of the computing device, the single use key encrypted with the second encryption using the device private key;
   electronically transmitting, by the transmitting device of the computing device, the decrypted single use key to a point of sale device, wherein
   the memory further includes payment credentials, and
   the payment credentials are electronically transmitted to the point of sale device with the decrypted single use key.

2. The method of claim 1, further comprising:
   receiving, by the receiving device of the computing device, a notification of successful authentication of the computing device, authentication of the computing device being based on the device data, wherein
   the single use key encrypted using the first encryption is electronically transmitted to the server separately upon receipt of the notification of successful authentication.

3. The method of claim 1, wherein the decrypting, by the encryption module of the computing device, the single use key encrypted with the second encryption using the device private key is in response to:
   receiving, by an input device interfaced with the computing device, and instruction requesting usage of the single use key.

4. A method for distributing data to a computing device using device level authentication, comprising:
   receiving, by a receiving device of a processing server, a personal identification number associated with a transaction account from an issuing institution;
   storing, in a memory of the processing server, at least a server private key of a key pair and the personal identification number;
   receiving, by the receiving device of the processing server, at least a device public key wrapped with a server public key corresponding to the server private key of the key pair, device data, and a single use key encrypted by the issuing institution using a first encryption from a computing device;
   electronically transmitting, by a transmitting device of the processing server, at least the device data to a third party for authentication of the computing device;
   receiving, by the receiving device of the processing server, a notification from the third party indicating successful authentication of the computing device;
   unwrapping, by an encryption module of the processing server, the device public key using the server private key;
   decrypting, by the encryption module of the processing server, the single use key using the personal identification number;
   encrypting, by the encryption module of the processing server, the single use key with a second encryption using the unwrapped device public key;
   electronically transmitting, by the transmitting device of the processing server, the single use key encrypted using the second encryption to the computing device;

decrypting, by the encryption module of the computing device, the single use key encrypted with the second encryption using the server private key;

identifying, by the computing device, payment credentials using the decrypted single use key; and electronically transmitting, by the transmitting device of the computing device, the decrypted single use key and the identified payment credentials to a point of sale device.

5. The method of claim 4, wherein the single use key encrypted using the first encryption is received via a separate electronic transmission from the computing device following receipt of the notification indicating successful authentication of the computing device.

6. The method of claim 5, further comprising:

electronically transmitting, by the transmitting device of the processing server, a notification indicating successful authentication of the computing device to the computing device, wherein the notification is electronically transmitted prior to receipt of the separate electronic transmission from the computing device.

7. A system for distributing data to a computing device using device level authentication, comprising:

a receiving device of a computing device configured to receive a single use key from an issuing institution, the single use key encrypted by the issuing institution using a first encryption, a server public key, and device data;

a memory of the computing device configured to store at least the single use key encrypted using the first encryption, a server public key, and device data;

a generation module of the computing device configured to generate a key pair comprising a device private key and a corresponding device public key;

an encryption module of the computing device configured to wrap the device public key using the server public key;

a transmitting device of the computing device configured to electronically transmit at least the device data, wrapped device public key, and the single use key encrypted with the first encryption to a server;

the receiving device of the computing device configured to receive the single use key encrypted using a second encryption from the server, the second encryption using the device public key to encrypt the single use key;

a querying module of the computing device configured to execute a query on the memory to insert the received single use key encrypted with the second encryption;

the encryption module of the computing device is further configured to decrypt the single use key encrypted with the second encryption using the device private key, wherein the memory further includes payment credentials, and the transmitting device of the computing device is further configured to electronically transmit the decrypted single use key and the payment credentials to a point of sale device.

8. The system of claim 7, wherein the receiving device of the computing device is further configured to receive a notification of successful authentication of the computing device, authentication of the computing device being based on the device data, and the single use key encrypted using the first encryption is electronically transmitted to the server separately upon receipt of the notification of successful authentication.

9. The system of claim 7, wherein the decrypting of the single use key encrypted with the second encryption using the device private key in in response to:

an input device interfaced with the computing device configured to receive and instruction requesting usage of the single use key.

10. A system for distributing data to a computing device using device level authentication, comprising:

an encryption module of a processing server;

a receiving device of the processing server configured to receive a personal identification number associated with a transaction account from an issuing institution;

a memory of the processing server configured to store at least a server private key of a key pair and the personal identification number;

the receiving device of the processing server configured to receive at least a device public key wrapped with a server public key corresponding to the server private key of the key pair, device data, and a single use key encrypted by the issuing institution using a first encryption from a computing device;

a transmitting device of the processing server configured to electronically transmit at least the device data to a third party for authentication of the computing device, wherein the receiving device of the processing server is further configured to receive a notification from the third party indicating successful authentication of the computing device, the encryption module of the processing server is configured to:

unwrap the device public key using the server private key, decrypt the single use key using the personal identification number, and encrypt the single use key using a second encryption using the unwrapped device public key;

the transmitting device of the processing server is further configured to electronically transmit the single use key encrypted using the second encryption to the computing device;

decrypting, by the encryption module of the computing device, the single use key encrypted with the second encryption using the device private key;

electronically transmitting, by the transmitting device of the computing device, the decrypted single use key to a point of sale device, wherein the memory further includes payment credentials, and the payment credentials are electronically transmitted to the point of sale device with the decrypted single use key.

11. The system of claim 10, wherein the single use key encrypted using the first encryption is received via a separate electronic transmission from the computing device following receipt of the notification indicating successful authentication of the computing device.

12. The system of claim 11, wherein the transmitting device of the processing server is further configured to electronically transmit a notification indicating successful authentication of the computing device to the computing device, wherein the notification is electronically transmitted prior to receipt of the separate electronic transmission from the computing device.

* * * * *